United States Patent
Hoshino et al.

(10) Patent No.: US 6,820,208 B2
(45) Date of Patent: Nov. 16, 2004

(54) IC CARD, IC CHIP, DATA ASSURING METHOD AND POWER SUPPLY MONITOR METHOD

(75) Inventors: Masao Hoshino, Kawasaki (JP); Toshiyuki Teramoto, Kawasaki (JP); Tomomi Shiobara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 755 days.

(21) Appl. No.: 09/729,162

(22) Filed: Dec. 5, 2000

(65) Prior Publication Data

US 2001/0027532 A1 Oct. 4, 2001

(30) Foreign Application Priority Data

Mar. 31, 2000 (JP) ........................................ 2000-099188

(51) Int. Cl.[7] .............................................. G06F 1/30
(52) U.S. Cl. ........................................ 713/340; 713/300
(58) Field of Search ................................ 713/300, 330, 713/340

(56) References Cited

U.S. PATENT DOCUMENTS

| 5,577,195 | A | | 11/1996 | Gochi | |
|---|---|---|---|---|---|
| 6,233,169 | B1 | * | 5/2001 | Nishimura | ............... 365/145 |
| 6,536,671 | B1 | * | 3/2003 | Baentsch | ............... 235/487 |
| 2002/0014537 | A1 | * | 2/2002 | Obana et al. | ............... 235/492 |

FOREIGN PATENT DOCUMENTS

| EP | 0 838 694 A1 | 4/1998 |
|---|---|---|
| EP | 0 950 983 A2 | 10/1999 |
| EP | 0 964 360 A1 | 12/1999 |

* cited by examiner

Primary Examiner—Dennis M. Butler
(74) Attorney, Agent, or Firm—Armstrong, Kratz, Quintos, Hanson & Brooks, LLP

(57) ABSTRACT

An IC card of the present invention, which receives a power supply or a radio wave from an upper apparatus so as to operate an internal IC chip, has, for example, an FeRAM which can be used as a program memory and a work memory. When a power supply is broken during a writing process so as not to be supplied to the inside, a ferroelectric capacitor in the FeRAM 4 is used so that a voltage for time required for completing the writing process is secured.

8 Claims, 6 Drawing Sheets

IC CARD, IC CHIP, DATA ASSURING METHOD AND POWER SUPPLY MONITOR METHOD

FIELD OF THE INVENTION

The present invention relates to a contact IC card for reading/writing data input from a predetermined terminal, and a non-contact IC card for reading/writing data via a radio interface. More specifically, the invention relates to an IC card which can assure on-processing data in the case where power supply and radio-wave supply are interrupted during communication, an IC chip and a data assuring method.

BACKGROUND OF THE INVENTION

In recent years, IC cards which contain CPU and has a memory capacity larger than that of magnetic cards are introduced to various places. The IC cards are researched as succession of magnetic cards, and the IC cards are beginning to be adopted as, for example, credit cards and personal cards for storing welfare/health data. There exists a future plan that an IC card, which can be utilized as a multifunction card system which provides various card services using one card, and a card system which cooperates with another card service industry so as to provide more services, is allowed to spread.

There will be explained below an operation of a prior IC card. For example, a contact IC card receives a power supply from an upper apparatus by a power-supply terminal so that an IC chip in the IC card is actuated. More specifically, the contact IC card has terminals for a chip voltage (VCC), a reset signal (RST), a clock signal (CLK), a zero voltage (GND), an auxiliary voltage (VPP) and data transmission/receiving (I/O). The contact IC card is connected to a reader/writer, and receives VCC supply from the upper apparatus so as to execute various processes (reading, writing and the like) which synchronize with CLK.

Meanwhile, a non-contact IC card receives a radio wave from an upper apparatus, and converts the radio wave received in the IC card into a power supply so as to actuate an IC chip. More specifically, for example the non-contact IC card executes various processes (reading, writing and the like) by means of the upper apparatus connected to a reader/writer and a radio wave under the conditions that a center frequency is 13.56 MHz, a degree of modulation is 100%, a sub-carrier is none, a modulation technique is ASK, a coding system is Modified Miller and a communication speed is 106 kbps.

There will be explained below a flow of a data writing process in the prior IC card. FIG. 5 is a flow chart showing the flow of the data writing process. The upper apparatus transmits an updating command (including updated data) to the IC card (step S101), and waits for a response from the IC card.

Next, the IC card receives the updating command from the upper apparatus (step S102), and retrieves a data updating area based on control information stored inside (pointer information showing which area data are written by the previous process) (step S103). At this time, the IC card writes the updated data into a next area (address) of the area for the previous data stored in a memory area (step S104). After the data writing is completed, the IC card updates the control information (step S105), and transmits a response showing that the writing process is normally completed to the upper apparatus (step S106).

Finally, the upper apparatus receives the response from the IC card which is the communicating mate transmitting the updating command previously and ends a series of the data writing process (step S107).

In such a manner, the prior IC card rewrites data according to the control by means of the upper apparatus so that the data in the memory such as information about a credit card, personal information used for storing welfare/health data and fee information are always maintained in the latest state.

In addition, FIG. 6 is a diagram showing a power-supply monitor method by means of the prior IC card. In the prior IC card, a threshold value of the power supply which represents an operating area and an operation-forbidden area is provided. For example, when the power supply (VCC) is within a range of the operating area shown in the drawing, the writing process can be executed. Meanwhile, when VCC is within a range of the operation-forbidden area (high voltage area, low-voltage area), the operation is forcibly stopped. Thereafter, when VCC is returned to the operating area, the IC card is again activated.

As mentioned above, in the prior IC card, the power-supply area which assures the certain operation is previously provided to prevent a misoperation such that incorrect data are written into a memory.

However, a power supply is occasionally broken during writing in the IC card. More specifically, in the contact IC card, the following cases are considered as the causes: the case that a power supply from the upper apparatus is interrupted due to any trouble; the case that contact of the power-supply terminal is insufficient; and the case that the IC card comes off (including the case where the IC card is removed intentionally). On the other hand, in the non-contact IC card, the following cases are considered as the causes: the case that a radio wave from the upper apparatus is interrupted due to any trouble; and the case that a user of the IC card is separated from an area where a radio wave can be received.

In these cases, the prior IC cards have a problem such that the writing process is interrupted/ended even in the middle of writing.

More specifically, for example in the case where a power supply is interrupted (due to the above causes) at a stage that fourth-bit writing is completed in a 1-byte writing process (see FIG. 7), the remaining 4 bits data are not updated, and incorrect data which are not different from data to be originally written by CPU are possibly written into the memory. An example of this problem is that in the case where data to be written is fare data, fare data which do not match the fare to be originally updated are written. Moreover, since this state is not posted to CPU, "misoperation possibly occurs at the time of restarting". This occurs in the case where on-writing data are program.

In addition, in the prior IC cards, as explained in the prior art, since a threshold value of a power-supply area for assuring certain operation is previously provided, when a power supply is less than the threshold value, the operation is forcibly stopped.

Further, in the case where the operation is forcibly stopped as mentioned above and immediately after that the power supply is returned to the operating area, the prior IC cards require a reactivating process, and accordingly the processing speed is reduced.

SUMMARY OF THE INVENTION

It is an object of the invention to provide an IC card which can assure an operation of a writing cycle in the middle of processing even in the case where a power supply (contact IC card) or a radio wave (non-contact IC card) is not supplied due to any reasons, and a data assuring method.

Further, it is another object of the present invention to provide an IC card which sets an unstable area of a power supply is set as "waiting area" of CPU so as to realize high-speed processing, and a power-supply monitor method.

In order to solve the above problems and achieve the objects, an IC card from a first aspect of the invention for receiving a power supply or a radio wave from an upper apparatus so as to operate an internal IC chip, is characterized by including: a memory element capable of being used as a program memory and a work memory, the memory element for storing electric charges in a capacitor, wherein when a power supply is broken during a writing process so as to not to be supplied inside, the electric charges stored in the capacitor in the memory element are used so that a voltage for time required for completing a unit writing cycle is secured, and the current writing process is continued without interruption, and at a stage that the unit writing cycle is completed, the process is ended.

According to the invention, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, the ferroelectric capacitor in the FeRAM is used so that a voltage for the time required for the remaining writing cycle can be secured. As a result, the writing data can be assured.

An IC card from a second aspect of the invention is characterized in that the memory element is a non-volatile memory having a structure that the voltage for the time required for completing the writing process can be secured.

According to the invention, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, a non-volatile memory other than FeRAM is used so that a voltage for the time required for the remaining writing cycle can be secured.

An IC card from a third aspect of the invention, is characterized by further including: a power-supply monitor circuit for monitoring a voltage level of a power supply, wherein a judgment is made as to whether the current voltage level of the power supply is in an operating area showing an operable voltage range, in an operation-forbidden area showing an operation-forbidden voltage range, or in an operation waiting area showing an operation waiting voltage range, when the voltage level is changed from the operating area into the operation waiting area, the on-executing process is brought into the waiting state without ending the process, when the voltage level is changed from the operation waiting area into the operation-forbidden area, the operation is ended, and when the voltage level is changed from the operation waiting area into the operating area, the process in a waiting state is restarted.

According to the invention, when the area where the CPU is brought into the waiting state (operation waiting area) is provided between the operating area and the operation-forbidden area of low voltage, incorrect data are possibly written into the memory, but the operation of the IC card is not forcibly stopped and the CPU is first set into the waiting state in the voltage area which does not become a problem at all when the CPU waits. As a result, when the power-supply voltage is returned to the operating area, the reactivating process which is required for the prior arts is not necessary. Accordingly, a high-speed process can be realized.

An IC chip from a fourth aspect of the invention for receiving a power supply or a radio wave from an upper apparatus so as to be operated, is characterized by including: a memory element capable of being used as a program memory and a work memory, the memory element for storing electric charges in a capacitor, wherein when a power supply is broken during a writing process so as to not to be supplied inside, the electric charges stored in the capacitor in the memory element are used so that a voltage for time required for completing a unit writing cycle is secured, and the current writing process is continued without interruption, and at a stage that the unit writing cycle is completed, the process is ended.

According to the invention, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, the ferroelectric capacitor in the FeRAM is used so that a voltage for the time required for the remaining writing cycle can be secured. As a result, the writing data can be assured.

An IC chip from a fifth aspect of the invention is characterized in that the memory element is a non-volatile memory having a structure that the voltage for the time required for completing the writing process can be secured.

According to the invention, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, a non-volatile memory other than FeRAM is used so that a voltage for the time required for the remaining writing cycle can be secured.

An IC chip from a sixth aspect of the invention is characterized by further including: a power-supply monitor circuit for monitoring a voltage level of a power supply, wherein a judgment is made as to whether the current voltage level of the power supply is in an operating area showing an operable voltage range, in an operation-forbidden area showing an operation-forbidden voltage range, or in an operation waiting area showing an operation waiting voltage range, when the voltage level is changed from the operating area into the operation waiting area, the on-executing process is brought into the waiting state without ending the process, when the voltage level is changed from the operation waiting area into the operation-forbidden area, the operation is ended, and when the voltage level is changed from the operation waiting area into the operating area, the process in a waiting state is restarted.

According to the invention, when the area where the CPU is brought into the waiting state (operation waiting area) is provided between the operating area and the operation-forbidden area of low voltage, incorrect data are possibly written into the memory, but the operation of the IC chip is not forcibly stopped and the CPU is first set into the waiting state in the voltage area which does not become a problem at all when the CPU waits. As a result, when the power-supply voltage is returned to the operating area, the reactivating process which is required for the prior arts is not necessary. Accordingly, a high-speed process can be realized.

A data assuring method from a seventh aspect of the invention is characterized in that when a power supply is broken during a writing process so as not to be supplied into an IC card, electric charges stored in a capacitor in a memory element usable as a program memory and a work memory are used so that a voltage for time required for completing a unit writing cycle is secured, and the current writing process is continued without interruption, and at a stage that the unit writing cycle is completed, the process is ended.

According to the invention, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, the ferroelectric, capacitor in the FeRAM is used so that a voltage for the time required for the remaining writing cycle can be secured. As a result, the writing data can be assured.

A power-supply monitor method from an eighth aspect of the invention is characterized by including the steps of: monitoring a voltage level of a power supply so as to make a judgment as to whether or not the voltage level is in an operating area showing an operable voltage range, in an operation-forbidden area showing an operation-forbidden voltage range or in an operation waiting area showing an operation waiting voltage range; when the voltage level is changed from the operating area into the operation waiting area, bringing the on-executing process into the waiting state without ending the process; when the voltage level is changed from the operation waiting area into the operation-forbidden area, ending the process; and when the voltage level is changed from the operation waiting area into the operating area, restarting the process in a waiting state.

According to the invention, when the area where the CPU is brought into the waiting state (operation waiting area) is provided between the operating area and the operation-forbidden area of low voltage, incorrect data are possibly written into the memory, but the operation of the IC card is not forcibly stopped and the CPU is first set into the waiting state in the voltage area which does not become a problem at all when the CPU waits. As a result, when the power-supply voltage is returned to the operating area, the reactivating process which is required for the prior arts is not necessary. Accordingly, a high-speed process can be realized.

Other objects and features of this invention will become understood from the following description with reference to the accompanying drawings.

DESCRIPTION OF THE PREFERRED EMBODIMENTS

There will be detailed below preferred embodiments of an IC card and an IC chip of the present invention with reference to the drawings. Here, the present invention is not limited to the embodiments.

Figure 1:
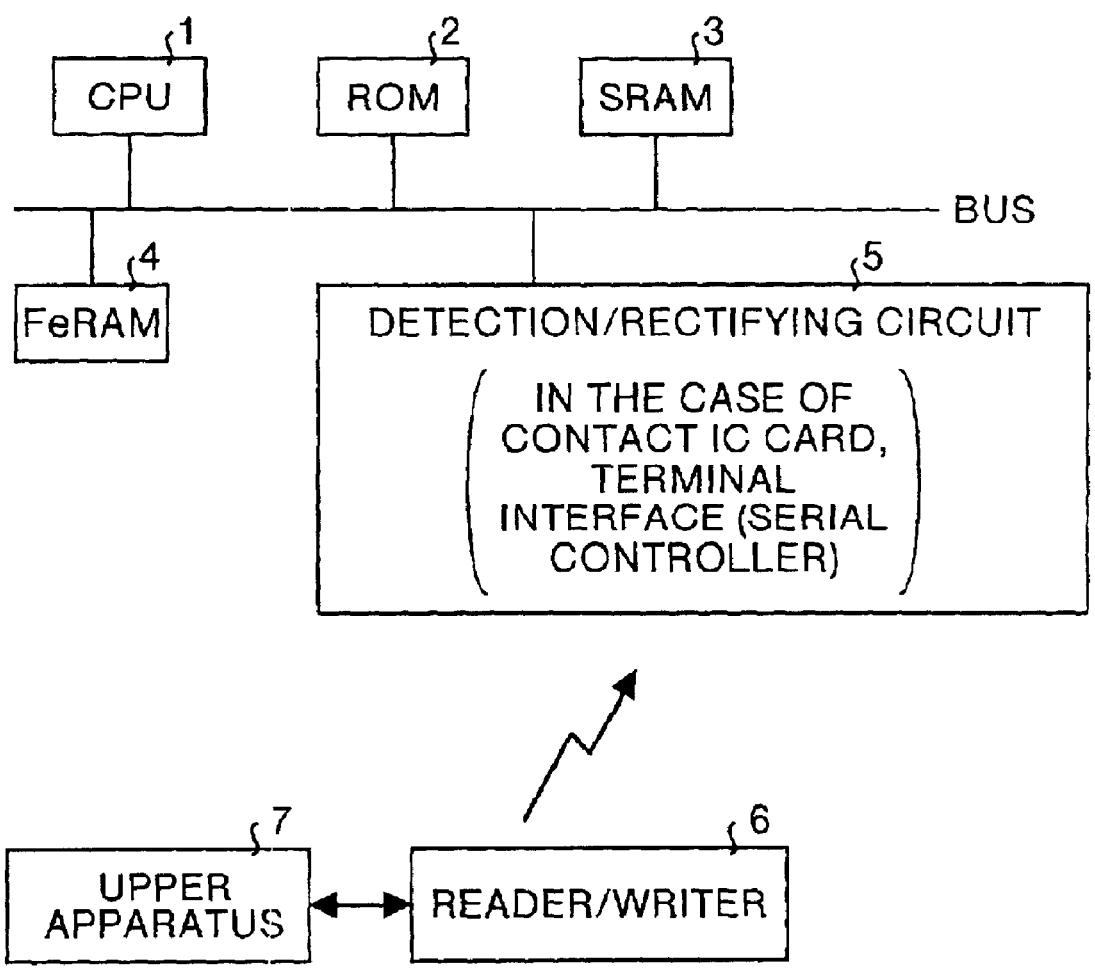
FIG. 1 is a diagram showing a structure of an IC card according to a first embodiment of the present invention.

FIG. 1 is a diagram showing the structure of the IC card or IC chip according to a first embodiment of the present invention. In the present embodiment, a non-contact IC card is used as the IC card, and its operation will be explained. In FIG. 1, reference numeral 1 denotes CPU, reference numeral 2 denotes ROM, reference numeral 3 denotes SRAM, reference numeral 4 denotes FeRAM, reference numeral 5 denotes a detection/rectifying circuit, reference numeral 6 denotes a reader/writer and reference numeral 7 denotes an upper apparatus. The CPU1, the ROM 2, the SRAM 3, the FeRAM 4 and the detection/rectifying circuit 5 composing the non-contact IC card are connected to one another via a system bus.

The non-contact IC card receives a radio wave from the upper apparatus, and converts the received radio wave into a power supply in the IC card so as to activate the IC chip. More specifically, various processes (reading, writing and the like) are executed by the upper apparatus 7 connected to the reader/writer 6 and a radio under the conditions, for example, that a center frequency is 13.56 MHz, a degree of modulation is 100%, a sub-carrier is none, a modulation technique is ASK, a coding system is Modified Miller and a communication speed is 106 kbps.

In addition, in the present embodiment, the FeRAM 4 (a kind of a non-volatile memory), which is a ferroelectric memory with writing time similar to that of normal SRAM and can be used as a program memory and a work memory, is adopted.

For convenience of the explanation, the present embodiment will explain characteristics of the present invention using the non-contact IC card (hereinafter, the non-contact IC card in the present embodiment is referred to as the IC card), but the present invention is not limited to this, and for example in the case where a contact IC card is used, the similar effect can be obtained. In the case where the contact IC card is used, the detection/rectifying circuit 5 is replaced by a serial controller. More concretely, the contact IC card has terminals for a chip voltage (VCC), a reset signal (RST), a clock signal (CLK), a zero voltage (GND), an auxiliary voltage (VPP) and data transmission/receiving (I/O). The contact IC card is connected to a reader/writer, and receives VCC supply from the upper apparatus so as to execute various processes (reading, writing and the like) which synchronize with CLK.

In FIG. 1, the CPU 1 executes an application program for an operation as the IC card. The ROM 2 includes memories such as EPROM and EEPROM, and stores a program to be executed by the CPU 1. The SRAM 3 operates as an operating area (work memory), and stores data and the like obtained at the process, for example. The FeRAM 4 operates as a program memory and a work memory, and particularly stores important writing data which are hoped for assurance. The detection/rectifying circuit 5 receives a signal from the upper apparatus 7, and detects and rectifies the signal, and writes desired data into the FeRAM 4 or the SRAM. Here, in the case of the contact IC card, the serial controller writes data supplied from the I/O terminal into the FeRAM 4 or the SRAM according to a prescribed protocol.

Figure 2:
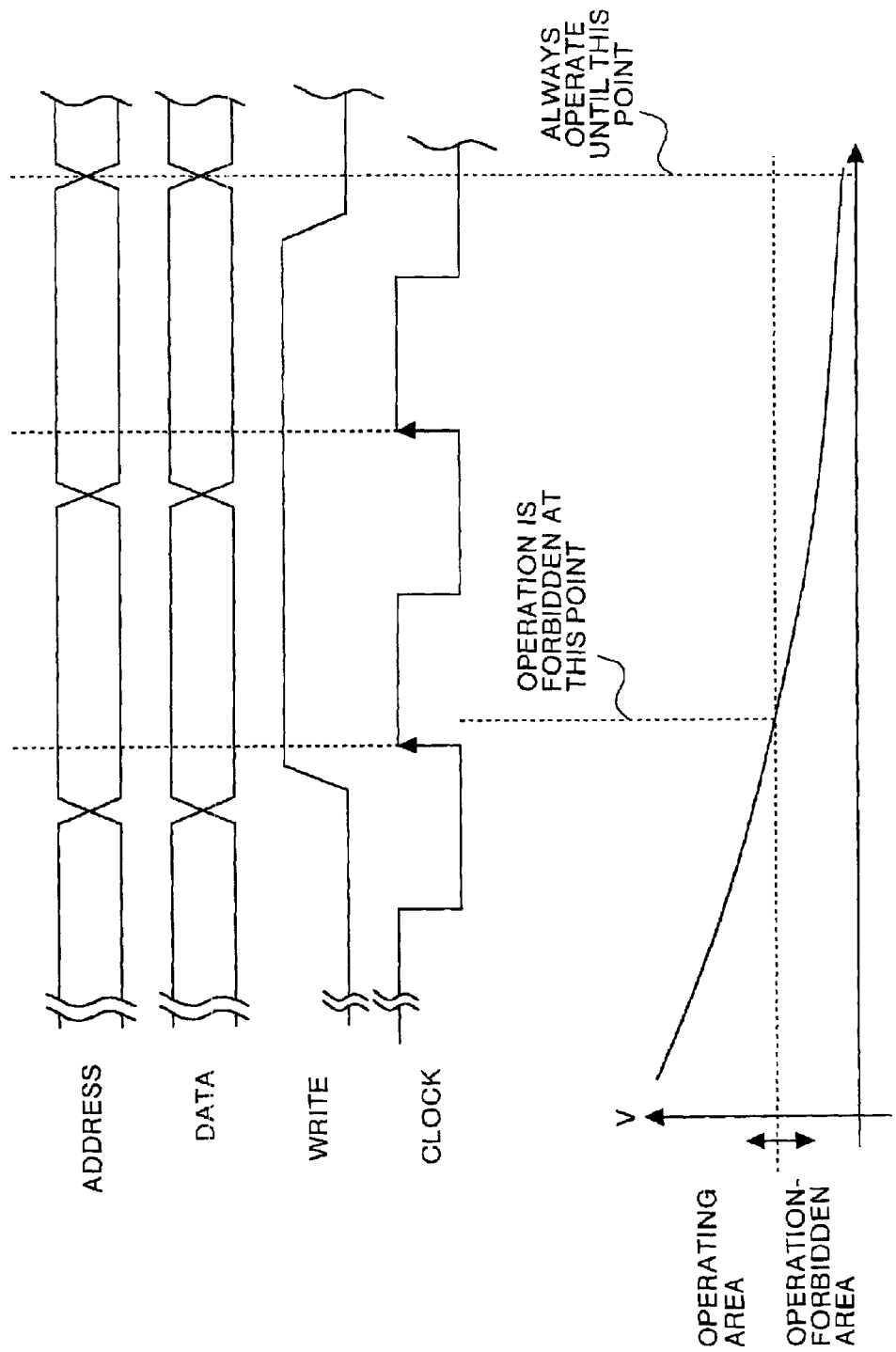
FIG. 2 is a timing chart showing a writing cycle (word: 2 cycles) according to a second embodiment.

There will be explained below the writing process of the IC card according to the present invention. Here, particularly a case where a radio wave (power supply) is not supplied due to any causes during the execution of the writing cycle is assumed. FIG. 2 is a timing chart showing the writing cycle (word: 2 cycle) of the present embodiment. For example, when effective address and data are input into the FeRAM 4 and a write signal (here, for convenience, High active) is in an active state, the data writing process is started in synchronization with timing of a rise clock. At this time, the FeRAM 4 stores word data of this writing cycle.

In the case where a power supply is interrupted at the timing (dotted line) shown in FIG. 1 in this state, the FeRAM 4 uses electric charges stored in a ferroelectric capacitor in the FeRAM 4 so as to continue the writing cycle, and assures the operation of the on-executing writing cycle. Namely, the writing cycle continues until the writing process for 2 cycles is completed.

In the present embodiment, even in the case where a radio wave from the upper apparatus is interrupted due to any trouble and in the case where a radio wave is interrupted because a user of the IC card is separated from an area where a radio wave can be received, a voltage for time required for the remaining writing cycle can be ensured by using the electric charges stored in the ferroelectric capacitor in the FeRAM 4. For this reason, on-writing data can be assured. Moreover, even in the case where a power supply from the upper apparatus is interrupted due to any trouble and in the case where contact of the power-supply terminal is incomplete or the IC card comes off (including the case where the IC card is removed intentionally), the same effect can be obtained in the contact IC card.

The present embodiment explained that data are assured at the time of interrupting a power supply especially by the FeRAM 4, but the present invention is not limited to this, and for example, a known non-volatile memory may be used so as to provide a structure which can assure remaining time required for the writing cycle in progress (battery or the like).

Figure 3:
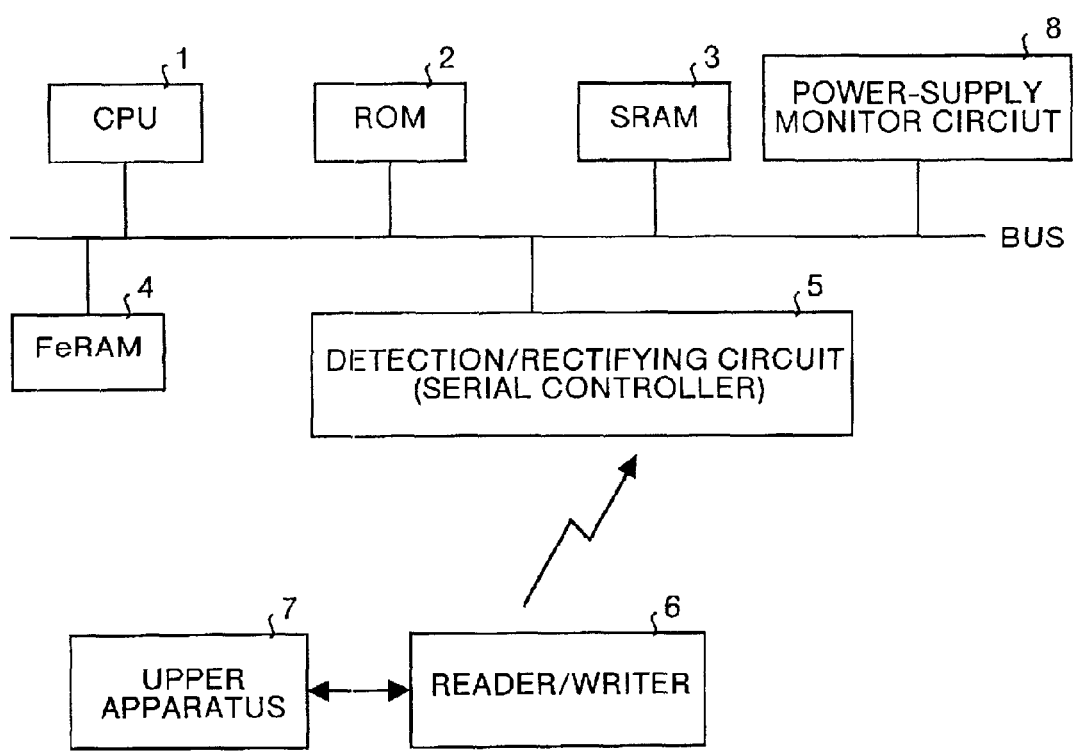
FIG. 3 is a diagram showing a structure of the IC card according to the second embodiment of the present invention.

FIG. 3 is a diagram showing a structure of the IC card or the IC chip according to a second embodiment of the present invention. In the present embodiment, in addition to the structure in the first embodiment, a power-supply monitor circuit 8 for monitoring a voltage level of a power supply is further provided. As a result, assurance of the operation in a state of an unstable power supply and high-speed process are realized. Here, the same reference numerals are given to the components which are the same as those in the first embodiment, and the description thereof is omitted. Moreover, for convenience of the explanation, the present embodiment will describe characteristics of the present invention using the non-contact IC card (hereinafter, the non-contact IC card in the present embodiment is referred to as the IC card), but similar to the first embodiment, the similar effect can be obtained in the case of using the contact IC card.

Figure 4:
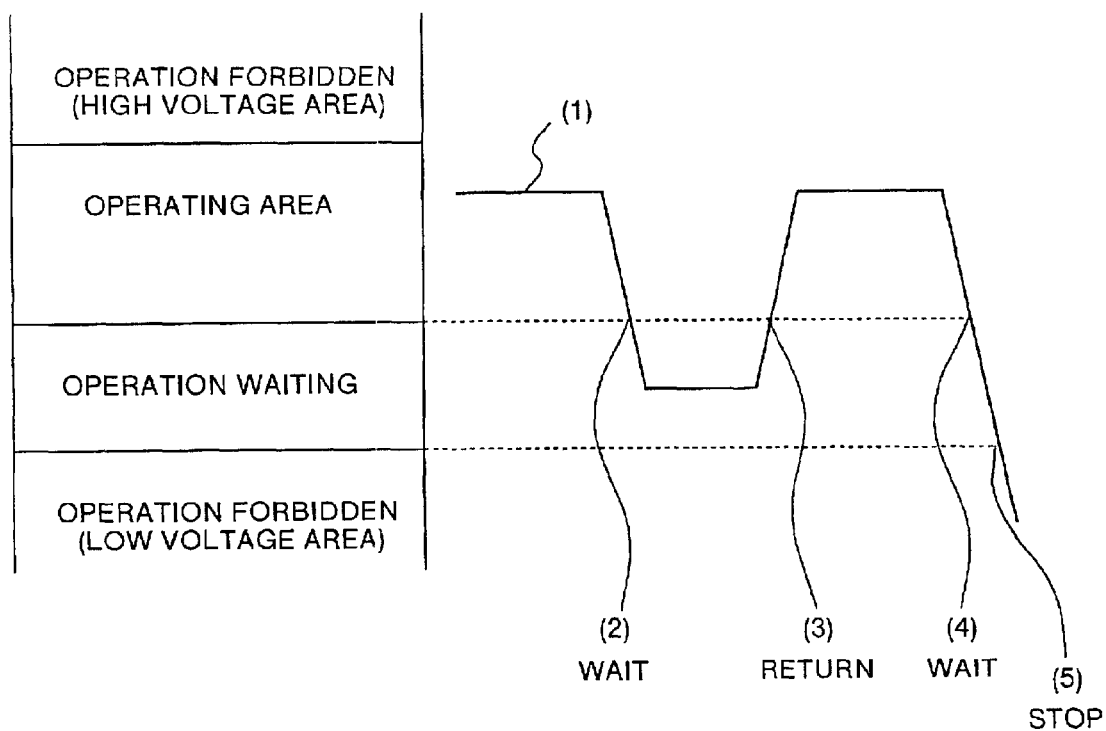
FIG. 4 is a diagram showing a power-supply monitor method according to the second embodiment.
Figure 5:
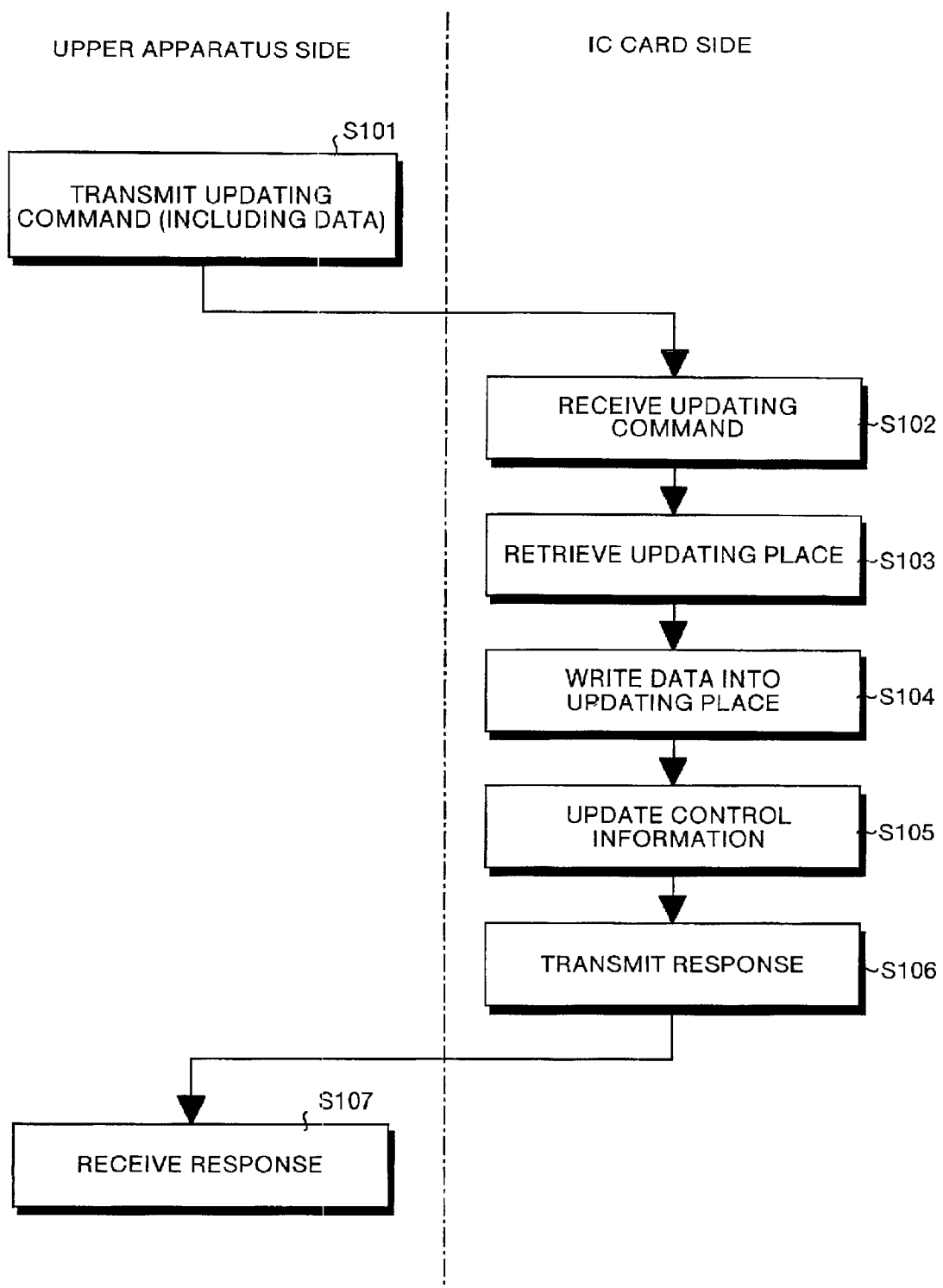
FIG. 5 is a flow chart showing a flow of a data writing process in a prior IC card.
Figure 6:
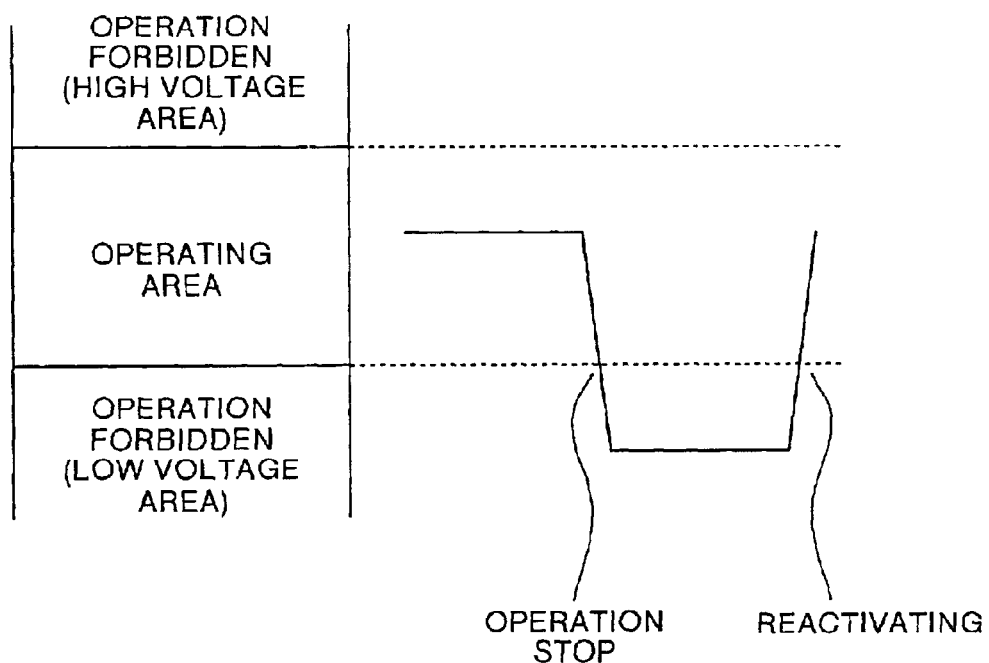
FIG. 6 is a diagram showing the power-supply monitor method using the prior IC card.
Figure 7:
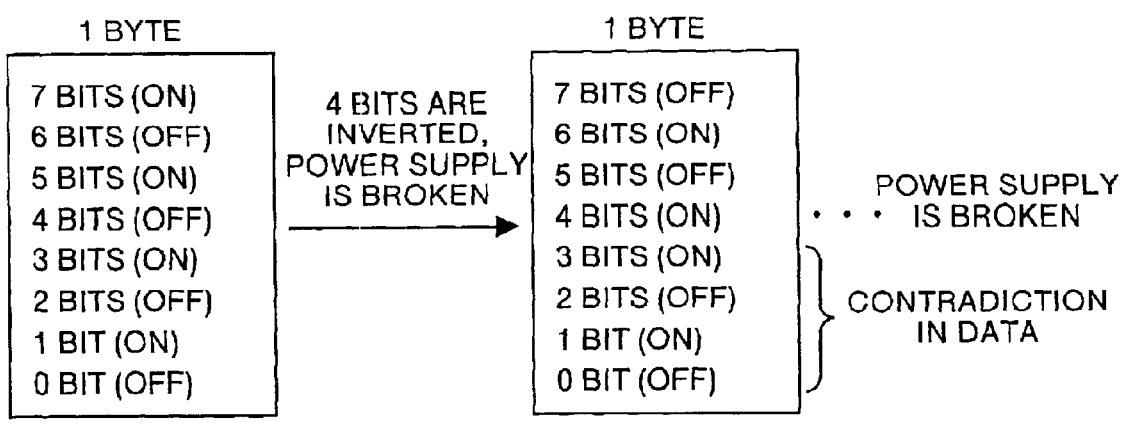
FIG. 7 is a diagram showing a problem of the prior art.

FIG. 4 is a diagram showing a power-supply monitor method of the present embodiment. In FIG. 4, an "operating area" shows that a current voltage level of a power supply is within an operable voltage range, "operation forbidden" shows that a voltage level is within an operation-forbidden voltage range, and "operation waiting" shows that a voltage level is within an operation-waiting voltage range". The characteristics of the present embodiment will be explained with reference to FIG. 4. In the IC card of the present embodiment, for example, a power-supply voltage in normal operation (corresponding to (1) in the drawing) gradually drops, and at the stage that the voltage level reaches a power-supply voltage of (2), the voltage is brought into the waiting state. This state is not a state that the operation of the IC card is completely inactivated, namely, for example, the internal CPU is in the waiting state. That is, the CPU process is not executed.

Next, for example, when in the above state the power-supply voltage gradually rises and the level reaches a power-supply voltage of (3), the CPU returns from the waiting state to the normal operation so as to start a next process of the process executed before the waiting. That is, here, the activating process of the IC card is not executed, and the process is restarted.

Next, for example, the power-supply voltage in normal operation (corresponding to (3) of the drawing) gradually drops and at the stage that the level reaches a power-supply voltage of (4), the CPU is brought into the waiting state again, and the voltage further drops. At the stage that the level reaches a power-supply voltage of (5), the IC card finally stops the operations completely. That is, the IC card is brought into the inactivated state.

Here, the power-supply voltage is detected by the power-supply monitor circuit 8, and the power-supply monitor circuit 8 generates an interrupt signal, for example, so as to post the respective states to the CPU 1.

In the present embodiment, the power-supply voltage is monitored in the above manner, namely, an area where the CPU is brought into the waiting state is provided between the operating area and the operation-forbidden area of low voltage. As a result, incorrect data are possibly written into the memory, but the operation of the IC card is not forcibly stopped and the CPU is first brought into the waiting state in the voltage area which does not become a problem when the CPU waits. As a result, in the case where the power-supply voltage returns to the operating area, the reactivating process which is required for the prior arts is not necessary, and accordingly the process can be sped up.

As mentioned above, according to the invention from a first aspect, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, the ferroelectric capacitor in the FeRAM is used so that a voltage for the time required for the remaining writing cycle can be secured. As a result, in the case where the power supply is broken during the writing, the IC card which can ensure the writing data can be obtained.

According to the invention from a second aspect, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, a non-volatile memory other than FeRAM is used so that the IC card which can secure a voltage for the time required for the remaining writing cycle can be obtained.

According to the invention from a third aspect, when the area where the CPU is brought into the waiting state (operation waiting area) is provided between the operating area and the operation-forbidden area of low voltage, incorrect data are possibly written into the memory, but the operation of the IC card is not forcibly stopped and the CPU is first set into the waiting state in the voltage area which does not become a problem at all when the CPU waits. As a result, when the power-supply voltage is returned to the operating area, the reactivating process which is required for the prior arts is not necessary. Accordingly, the IC card which can realize a high-speed process can be obtained.

According to the invention from a fourth aspect, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, the ferroelectric capacitor in the FeRAM is used so that a voltage for the time required for the remaining writing cycle can be secured. As a result, in the case where the power supply is broken during the writing, the IC chip which can ensure the writing data can be obtained.

According to the invention from a fifth aspect, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, a non-volatile memory other than FeRAM is used so that the IC chip which can secure a voltage for the time required for the remaining writing cycle can be obtained.

According to the invention from a sixth aspect, when the area where the CPU is brought into the waiting state (operation waiting area) is provided between the operating area and the operation-forbidden area of low voltage, incorrect data are possibly written into the memory, but the operation of the IC chip is not forcibly stopped and the CPU is first set into the waiting state in the voltage area which does not become a problem at all when the CPU waits. As a result, when the power-supply voltage is returned to the operating area, the reactivating process which is required for the prior arts is not necessary. Accordingly, the IC chip which can realize a high-speed process can be obtained.

According to the invention from a seventh aspect, in the case where the supply of a radio wave from the upper apparatus is interrupted due to any trouble, in the case where a user of the IC card is separated from the area where a radio wave is received and the supply of the radio wave is interrupted, in the case where the supply of a power supply from the upper apparatus is interrupted due to any trouble, or in the case where the contact of the power-supply terminal is incomplete or the IC card comes off, the ferroelectric capacitor in the FeRAM is used so that a voltage for the time required for the remaining writing cycle can be secured. As a result, in the case where the power supply is broken during the writing, the IC card which can ensure the writing data can be obtained.

According to the invention from an eighth aspect, when the area where the CPU is brought into the waiting state (operation waiting area) is provided between the operating area and the operation-forbidden area of low voltage, incorrect data are possibly written into the memory, but the operation of the IC card is not forcibly stopped and the CPU is first set into the waiting state in the voltage area which does not become a problem at all when the CPU waits. As a result, when the power-supply voltage is returned to the operating area, the reactivating process which is required for the prior arts is not necessary. Accordingly, the IC card which can realize a high-speed process can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An IC card for receiving a power supply or a radio wave from an upper apparatus so as to operate an internal IC chip, comprising:
   a memory element capable of being used as a program memory and a work memory, said memory element for storing electric charges in a capacitor, wherein
   when a power supply is broken during a writing process so as to not to be supplied inside, the electric charges stored in the capacitor in said memory element are used so that a voltage for time required for completing a unit writing cycle is secured, and the current writing process is continued without interruption, and at a stage that the unit writing cycle is completed, the process is ended.

2. The IC card according to claim 1, wherein said memory element is a non-volatile memory having a structure that the voltage for the time required for completing the writing process can be secured.

3. The IC card according to 1, further comprising:
   a power-supply monitor circuit which monitors a voltage level of a power supply, wherein
   a judgment is made as to whether the current voltage level of the power supply is in an operating area showing an operable voltage range, in an operation-forbidden area showing an operation-forbidden voltage range, or in an operation waiting area showing an operation waiting voltage range,
   when the voltage level is changed from the operating area into the operation waiting area, the on-executing process is brought into the waiting state without ending the process,
   when the voltage level is changed from the operation waiting area into the operation-forbidden area, the operation is ended, and
   when the voltage level is changed from the operation waiting area into the operating area, the process in a waiting state is restarted.

4. An IC chip for receiving a power supply or a radio wave from an upper apparatus so as to be operated, comprising:
   a memory element capable of being used as a program memory and a work memory, said memory element for storing electric charges in a capacitor, wherein when a power supply is broken during a writing process so as to not to be supplied inside, the electric charges stored in the capacitor in said memory element are used so that a voltage for time required for completing a unit writing cycle is secured, and the current writing process is continued without interruption, and at a stage that the unit writing cycle is completed, the process is ended.

5. The IC chip according to claim 4, wherein said memory element is a non-volatile memory having a structure that the voltage for the time required for completing the writing process can be secured.

6. The IC chip according to claim 4, further comprising:

a power-supply monitor circuit for monitoring a voltage level of a power supply, wherein a judgment is made as to whether the current voltage level of the power supply is in an operating area showing an operable voltage range, in an operation-forbidden area showing an operation-forbidden voltage range, or in an operation waiting area showing an operation waiting voltage range, when the voltage level is changed from the operating area into the operation waiting area, the on-executing process is brought into the waiting state without ending the process, when the voltage level is changed from the operation waiting area into the operation-forbidden area, the operation is ended, and when the voltage level is changed from the operation waiting area into the operating area, the process in a waiting state is restarted.

7. A data assuring method, wherein when a power supply is broken during a writing process so as not to be supplied into an IC card, electric charges stored in a capacitor in a memory element usable as a program memory and a work memory are used so that a voltage for time required for completing a unit writing cycle is secured, and the current writing process is continued without interruption, and at a stage that the unit writing cycle is completed, the process is ended.

8. A power-supply monitor method, comprising the steps of:

monitoring a voltage level of a power supply so as to make a judgment as to whether or not the voltage level is in an operating area showing an operable voltage range, in an operation-forbidden area showing an operation-forbidden voltage range or in an operation waiting area showing an operation waiting voltage range;

when the voltage level is changed from the operating area into the operation waiting area, bringing the on-executing process into the waiting state without ending the process;

when the voltage level is changed from the operation waiting area into the operation-forbidden area, ending the process; and when the voltage level is changed from the operation waiting area into the operating area, restarting the process in a waiting state.

* * * * *